No. 655,690. Patented Aug. 14, 1900.
R. COUTANT-DUJOUR.
TRACTION ENGINE.
(Application filed Feb. 9, 1899.)

(No Model.) 3 Sheets—Sheet 1.

No. 655,690. Patented Aug. 14, 1900.
R. COUTANT-DUJOUR.
TRACTION ENGINE.
(Application filed Feb. 9, 1899.)

(No Model.) 3 Sheets—Sheet 2.

Witnesses:

Inventor
Raoul Coutant-Dujour
By Wm E. Boulter
Attorney

No. 655,690. Patented Aug. 14, 1900.
R. COUTANT-DUJOUR.
TRACTION ENGINE.
(Application filed Feb. 9, 1899.)

(No Model.) 3 Sheets—Sheet 3.

UNITED STATES PATENT OFFICE.

RAOUL COUTANT-DUJOUR, OF PARIS, FRANCE, ASSIGNOR OF ONE-HALF TO EMILE SALMSON, OF SAME PLACE.

TRACTION-ENGINE.

SPECIFICATION forming part of Letters Patent No. 655,690, dated August 14, 1900.

Application filed February 9, 1899. Serial No. 705,082. (No model.)

*To all whom it may concern:*

Be it known that I, RAOUL COUTANT-DUJOUR, a citizen of the Republic of France, residing at Paris, France, have invented certain new and useful Improvements in or Relating to Traction-Engines and Road-Rollers, (for which application for Letters Patent has been made in Great Britain, No. 520, dated 9th day of January, 1899, and in France, No. 279,660, dated July 12, 1898,) of which the following is a specification.

The present invention relates to improvements in traction-engines or road-rollers such as are used for rolling of macadamized roads, whereby it is intended to replace the steam-roller or traction-engine generally used by a motor driven by petroleum or other heavy oil, whereby the advantage is secured that the frequent watering and coaling necessary for steam-rollers is avoided, as the oil-motor can be supplied at long intervals with the fuel required for several weeks of continuous work.

In order to render the nature of the invention more intelligible, the accompanying drawings illustrate, by way of example only, in—

Figure 1:
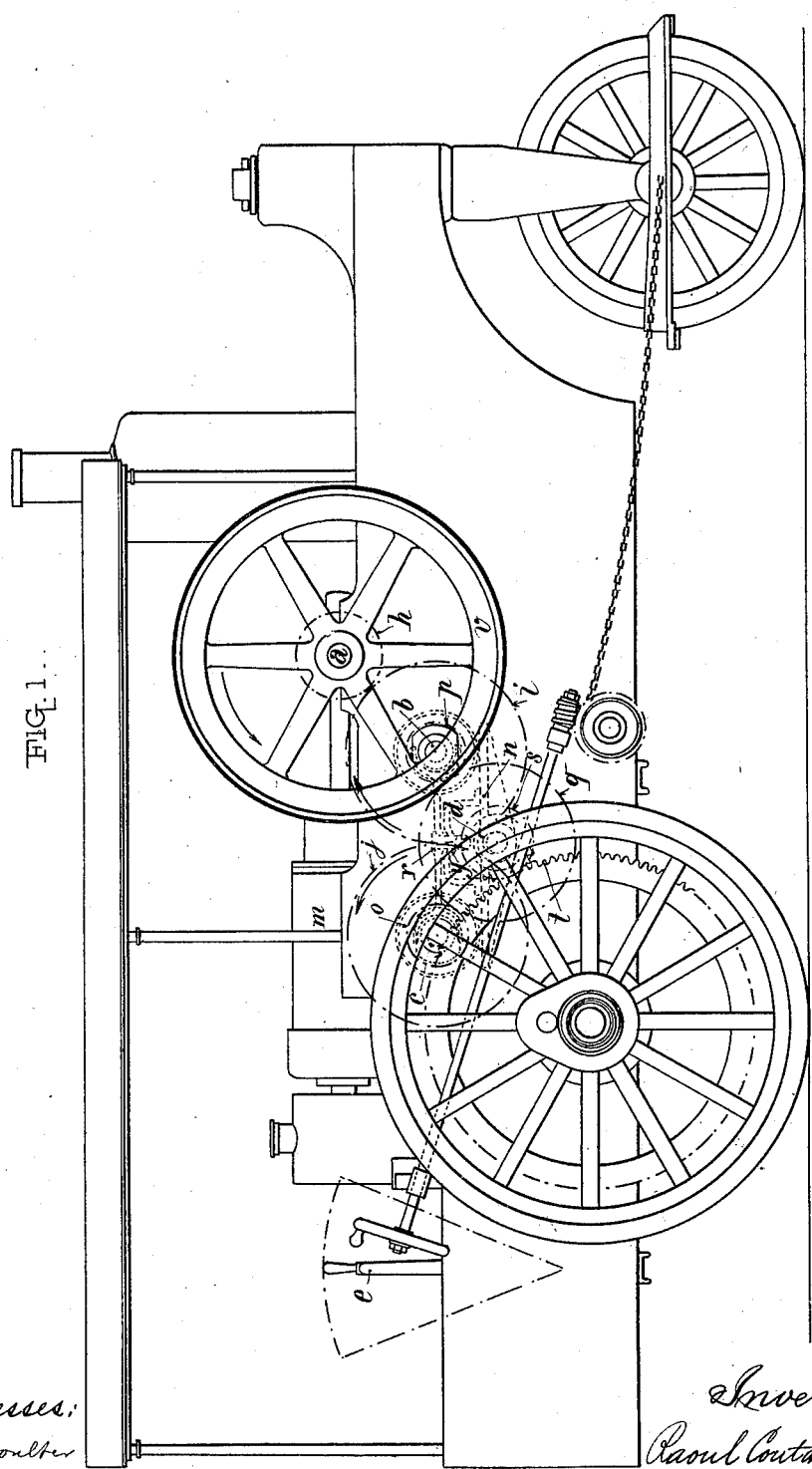
Figure 2:
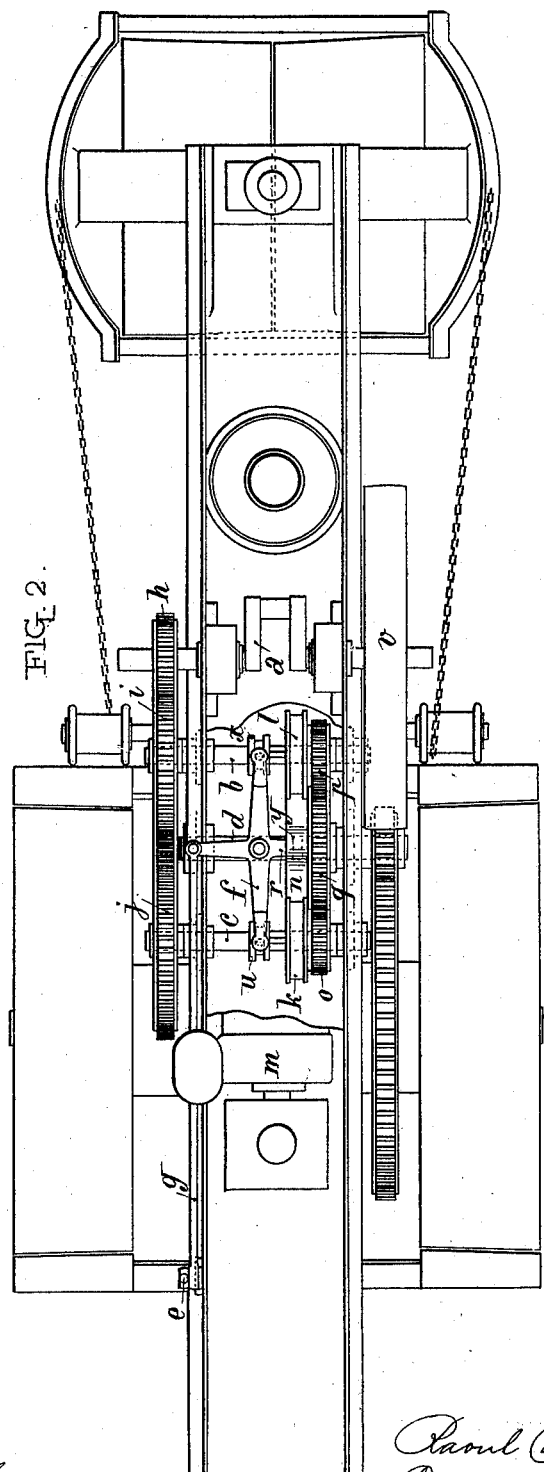
Figure 3:
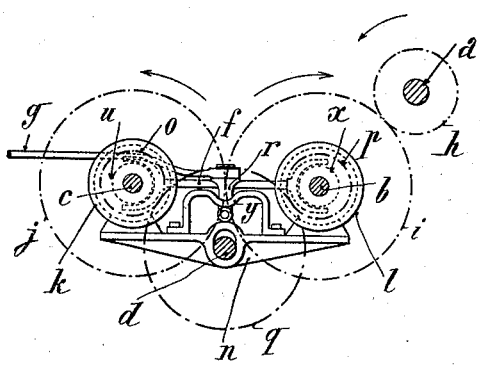
Figure 4:
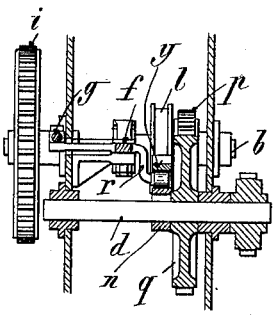
Figure 5:
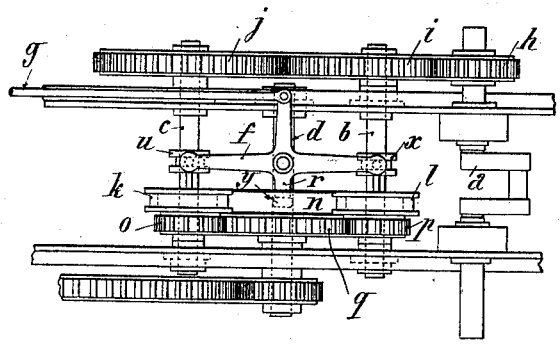

Figure 1, a side elevation of a road-roller constructed according to this invention; and in Fig. 2, a plan corresponding to Fig. 1, showing part of the machine removed in order to permit the transmission-gearing for driving and change of direction of movement to be seen. Fig. 3 is a detail sectional elevation of the brake devices. Fig. 4 is an end elevation, partly in section, of the parts seen in Fig. 3. Fig. 5 is a plan view of the parts seen in Figs. 3 and 4.

The crank-shaft $a$ of the motor $m$, which revolves in the direction indicated by the arrow, is provided on the side opposite the fly-wheel with a toothed pinion $h$, which through gearing $i$ transmits the movement to an intermediate shaft $b$. The same gearing $i$, by means of a second wheel $j$ of the same diameter, transmits the movement to a third shaft $c$ in such manner that the two shafts $b$ and $c$ are rotated in contrary direction, as indicated by the respective arrows, Fig. 1. On these two shafts $b$ and $c$ are mounted coupling drums or clutches $k$ and $l$, which are loose thereon, as well as pinions $o$ and $p$, which are also connected to the coupling-drums. These pinions $o$ and $p$ serve to transmit the movement to the vehicle in one or the other direction, according as one or the other pinion is coupled to its shaft by means of a central wheel $q$, secured to a shaft $d$, which also carries at one end another pinion $s$, geared to the toothed rim or wheel $t$, secured to the road-wheel of the vehicle.

The intermediate pinions $o$ and $p$, with their shafts $c$ and $b$, are alternately coupled by means of a double pivoted lever $f$, worked by a hand-lever $e$ and rod $g$. The ends of the double-armed lever $f$ are connected to or act upon sleeves $u$ and $x$, working on ribs on the intermediate shafts $b$ and $c$, respectively, in such manner that as the arms of the double-armed lever $f$ are moved in one or the other direction by means of the hand-lever $e$ so one or the other of the two intermediate pinions $o$ and $p$, which, as has been explained before, turn in opposite directions, becomes released or coupled to the center driving-shaft, whereby the road-roller is made to advance or to move backward, as the case may be.

When the double-armed lever $f$ is so placed as to uncouple both pinions with a view of stopping the vehicle, the lever $f$, which is provided also with the prolongation $r$, acts on the boss $y$ of a brake, the shoes of which press against the intermediate pinions $o$ and $p$ or coupling-drums, so that the roller can be stopped even on roads of steep declivity.

The brake comprises a balance-lever $n$, provided at each end with a brake-shoe and traversed by the shaft $d$, which passes through an oblong orifice or vertical slot, so as to allow of a vertical displacement of the said lever $n$ relatively to the shaft $d$. On this balanced lever is fixed a stirrup or bracket $y$, provided in the central part with a shoulder or bend projecting downward, on which operates a roller arranged at the end of the arm $r$ of a lever $f$, which is suitably curved. When one or the other of the gear-wheels $k$ or $l$ is in operation—in other words, when traveling in one or the other direction—the roller of the lever-arm $r$ will be in one or the other raised portions of the stirrup, and consequently the double brake will be out of operation. If now the conductor wishes to stop, he moves the operating-lever *g* into the middle position, Figs. 1 and 2. Both the gears *k* and *l* are then uncoupled, while the balanced lever *n* rises, owing to the roller of the lever-arm *r* being brought under the projecting bend of the stirrup, whereupon the brake-shoes of the said lever are pressed powerfully against the exterior cylindrical parts of the gears *k* and *l*, by which means the movement is stopped even on the steepest inclines.

I claim—

In a traction-engine or road-roller driven by petroleum or other oil, gearing comprising a double-armed lever acting on coupling-drums in such a manner as to cause one or other of two pinions on intermediate driving-shafts rotating in opposite directions to engage with and drive the one affecting the onward movement of a central pinion on a shaft from which the road-wheel of the vehicle is driven, while the other pinion for driving in the opposite direction is out of gear, said lever also serving for the purpose of applying a brake against both coupling-drums when both pinions are out of gear, substantially as described.

In testimony whereof I have hereto set my hand in the presence of the two subscribing witnesses.

RAOUL COUTANT-DUJOUR.

Witnesses:
 LOUIS SULLIGER,
 EDWARD P. MACLEAN.